(12) United States Patent
Miefalk et al.

(10) Patent No.: US 7,287,673 B2
(45) Date of Patent: Oct. 30, 2007

(54) AUTOMATIC DOSING DEVICE COMPRISING A CONTAINER AND THE USE OF SUCH AN AUTOMATIC DOSING DEVICE

(75) Inventors: Hakan Miefalk, Jarfalla (SE); Linda Menrik, Hagersten (SE)

(73) Assignee: Electrolux Home Products Corporation N.V., Zaventem (BE)

( * ) Notice: Subject to any disclaimer, the term of this patent is extended or adjusted under 35 U.S.C. 154(b) by 418 days.

(21) Appl. No.: 10/481,829

(22) PCT Filed: Apr. 4, 2003

(86) PCT No.: PCT/SE03/00550

§ 371 (c)(1),
(2), (4) Date: Dec. 23, 2003

(87) PCT Pub. No.: WO03/093560

PCT Pub. Date: Nov. 13, 2003

(65) Prior Publication Data

US 2005/0121471 A1    Jun. 9, 2005

(30) Foreign Application Priority Data

Apr. 29, 2002    (SE) ................................. 0201313

(51) Int. Cl.
G01F 11/02    (2006.01)
A47L 15/046    (2006.01)
(52) U.S. Cl. .................... 222/413; 222/236; 222/651
(58) Field of Classification Search ............... 222/231, 222/236, 413, 651
See application file for complete search history.

(56) References Cited

U.S. PATENT DOCUMENTS

| 1,519,664 | A | * | 12/1924 | Campbell | 222/240 |
| 3,197,083 | A | * | 7/1965 | Elliott et al. | 222/231 |
| 4,207,995 | A | | 6/1980 | Neely | |
| 4,487,337 | A | * | 12/1984 | DeJardins | 222/129.3 |
| 4,688,474 | A | * | 8/1987 | Anderl | 99/289 R |
| 5,063,757 | A | | 11/1991 | Ikeda et al. | |
| 5,287,993 | A | * | 2/1994 | Ford et al. | 222/135 |

FOREIGN PATENT DOCUMENTS

| DE | 4204736 A1 | 10/1992 |
| EP | 1101431 A1 | 5/2001 |

* cited by examiner

*Primary Examiner*—Kevin Shaver
*Assistant Examiner*—Melvin A Cartagena
(74) *Attorney, Agent, or Firm*—Pearne & Gordon LLP

(57) ABSTRACT

The present invention refers to a refill container unit for an automatic dosing device. The purpose of the automatic dosing device is to control the dosing of stored material kept inside the container unit. The object of the container unit according to the invention is to achieve an agitating and transporting, cleanable and switchable storing arrangement for the automatic dosing unit. The refill container unit therefore comprises an agitating part (14) enclosed by a receptacle (1). The agitating part (14) agitates and feeds the material. Shaped as a pot containing the material, the agitating part (14) can also be lifted out of the receptacle (1) and cleaned or replaced by another pot. As an alternative the whole refill container unit can be replaced.

5 Claims, 4 Drawing Sheets

AUTOMATIC DOSING DEVICE COMPRISING A CONTAINER AND THE USE OF SUCH AN AUTOMATIC DOSING DEVICE This application claims the benefit of International Application Number PCT/SE03/00550, which was published in English on Nov. 13, 2003.

TECHNICAL FIELD

The present invention refers to a refill container unit for an automatic dosing device. The purpose of the automatic dosing device is to control the dosing of stored material kept inside the container unit. The object of the container unit according to the invention is to achieve an agitating and transporting, cleanable and switchable storing arrangement for the automatic dosing unit. The refill container unit therefore comprises an agitating part enclosed by a receptacle. The agitating part agitates and feeds the material. Shaped as a pot containing the material, the agitating part can also be lifted out of the receptacle and cleaned or replaced by another pot. As an alternative the whole refill container unit can be replaced.

BACKGROUND OF THE INVENTION

Automatic dosing devices for different types of machines have since long been a target for manufactures. These devices shall be able to dose powder, liquid or other kinds of material from a container into a process. Therefore a various amount of dosing devices have been developed. Mostly these devices are developed for industrial use. They are therefore often quite expensive and/or complex constructions.

Recently there has been more focus on designing automatic dosing devices for household or at least cheaper appliances. Especially for laundry washing machines there is a large interest in achieving simple and reliable devices. Conventionally, such automatic dosing devices for dispensing a detergent into a washing tub has been proposed. The detergent is stored in a container and dispensed from a discharge at the outlet of the container. In order to avoid that vibrations causes detergent to fall out from the container at other occasions than when the detergent is to be dispensed, several proposed dosing devices have a discharge mechanism which is able to both dose and close the outlet.

U.S. Pat. No. 5,063,757 proposes a detergent dispenser with this kind of dosing and closing mechanism. The dispenser includes a detergent container with a lower discharge outlet from which stored detergent is discharged and a detergent fall preventing member displaced in the outlet in order to close the outlet when detergent is not dosed. The dosing is achieved by a helical coil/screw arranged is a discharge passageway. An agitating member is disposed in the detergent container in order to avoid clogging of the detergent. The helical coil or screw and the agitating member are rotated by an electric motor mounted together with the container. The container, with an outer and inner casing, is detachably mounted to the machine by claws.

Although the construction is developed to be detachably mounted inside a machine it has drawbacks. The detaching mechanism demands a careful handling by the user. The container and other parts also have to be clean to co-operate with the machine and in order to be fixed by the claws. Since the motor is placed with the container it is more expensive to have more than one dispenser for a machine. The container is also designed such that it makes it is difficult to fit in a space inside a washing machine in a proper way. Finally it is also important to create a construction as simple and cheap as possible, which means fewer and simpler parts than in this construction.

The present invention has been made with a view toward overcoming the above drawbacks of the prior art. A first object of the present invention is therefore to provide a refill container unit for an automatic dosing device such as the detergent dispenser described above. The container unit or at least some parts of it shall be able to detach from the automatic dosing device without mechanical problems in order to change types of material. It shall also be easy for a user to attach the container unit to the automatic dosing device. A second object of the present invention is to provide a refill container unit that avoids clogging of material inside the unit. In order to achieve that the material has to be agitated and not be exposed to humidity. A third object of the present invention is to achieve a cheap unit that is simple to manufacture. In order to achieve that the unit has to have few simple parts in cheap, reliable material. The refill container unit shall mainly be designed for an automatic dosing device for a clothes washing machine but the principle idea shall be applicable for any kind of machine that requires an automatic dosing device. The solution of this present invention is achieved according to the features disclosed in claim 1.

According to the present invention a refill container unit for storing material, agitating and transporting material is provided. The unit is operated by a rotating dosing screw rotated by an electric motor and interacting with an automatic dosing system according to the prior art and a below disclosed preferred embodiment. The refill container unit comprises an agitating part enclosed by a container part. Shaped as a pot containing the material, the agitating part can be lifted out of the receptacle and cleaned or replaced by another pot. As an alternative the whole refill container unit can be replaced.

DESCRIPTION OF DRAWINGS

The invention will be described in form of a preferred embodiment by making reference to the accompanying drawings, in which.

AN ILLUSTRATIVE PREFERRED EMBODIMENT

Figure 2:
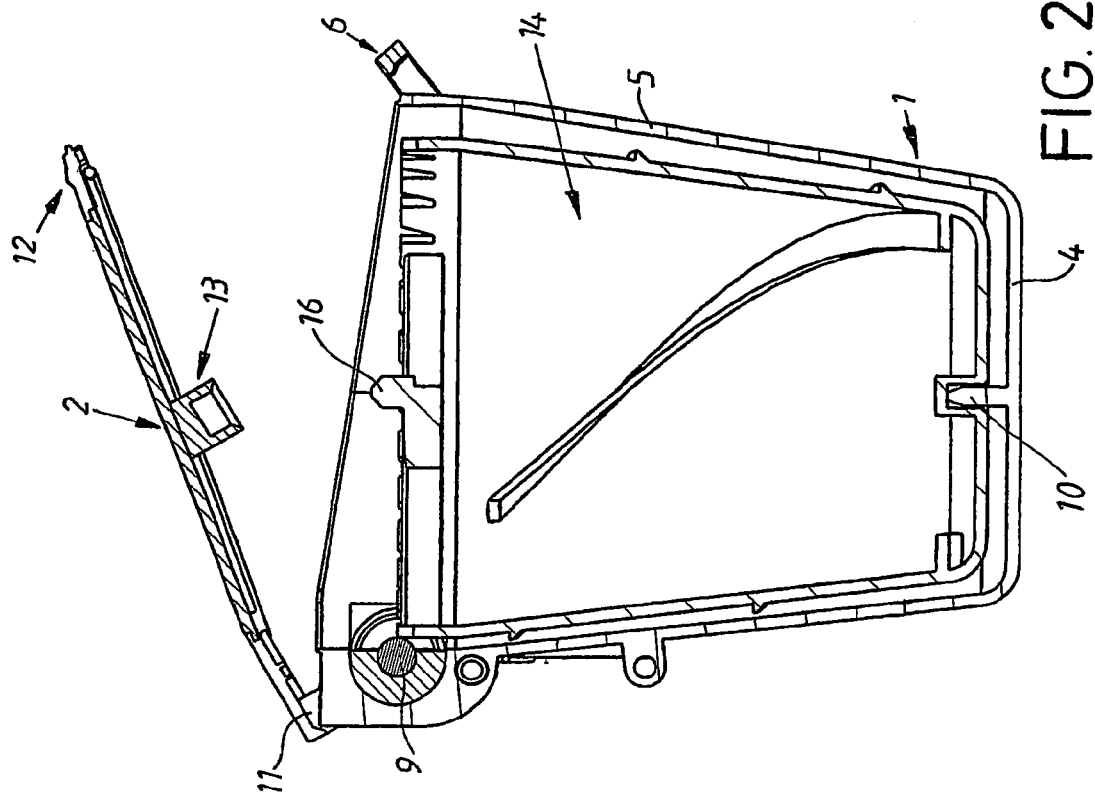
FIG. 2 is a vertical section of the present invention according to FIG. 1.

The container unit is a container for automatic dosing devices for laundry washing machines, whereby any reference concerning dosing material refers to detergent. The container unit comprises a receptacle 1, a cover 2 and a locking handle 3. The receptacle has a conical shape with an almost flat bottom 4 and an essentially circular side wall 5. It also comprises supports 6 for the locking handle. The receptacle also has a recess 7 that makes it possible to detachably attach the container unit to some kind of holder (not-shown). A channel 8 connecting the interior of the receptacle with the outside encloses a dosing screw 9 that feeds the detergent out from the receptacle through the channel. The receptacle 1 also comprises a shaft pin 10 that will be described further below.

The cover 2 is essentially flat and comprises brackets 11 that interact with the receptacle 1 to achieve a hinge connection. The cover is preferably partly be made of, a transparent material in order to enable for the user to see the inside without having to open the cover. In the front end the cover has locking means 12 that interacts with the handle 3 when the cover is closing the receptacle in order to seal the container unit properly. The cover also comprises a shaft pin 13 that will be described further below.

The agitating part 14 according to the preferred embodiment has a shape similar to the receptacle 1 in order to interact in a proper way. The part has a bottom recess 15 that interacts with the shaft pin 10 to achieve a first end of an axis around which the agitating part can rotate. Further, a central pin 16 of the part interacts with the shaft pin 13 when the cover 2 is closed in order to achieve the second end of the same axis. In order to achieve a support for the pin 16 a frame 17 comprising three arms is arranged. By means of the interactions the agitating part can rotate in a proper way inside the receptacle, which is essential to achieve the objects mentioned above. The function of the agitating part is described further below.

Figure 6:
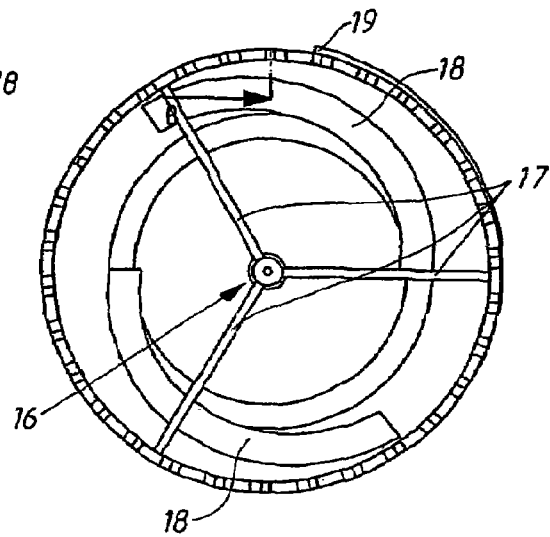
FIG. 6 is a top plan view of the agitating part according to FIG. 4.

The agitating part 14 also on its interior side has two helical flanges 18. These flanges extend upwards the inner side wall of the part approximately 120 degrees, see FIG. 6. The width of the flanges is approximately 15 mm. The agitating part on its outer side has a helical ridge. This ridge extends stretches around the outer side wall of the part approximately two turns. The width of the ridge is approximately 5 mm. The agitating part 14 has a flat bottom 20 and an upper edge that constitutes of teeth 21. These teeth extend around the part edge and are shaped in order to interact with the thread of the dosing screw.

Figure 9:
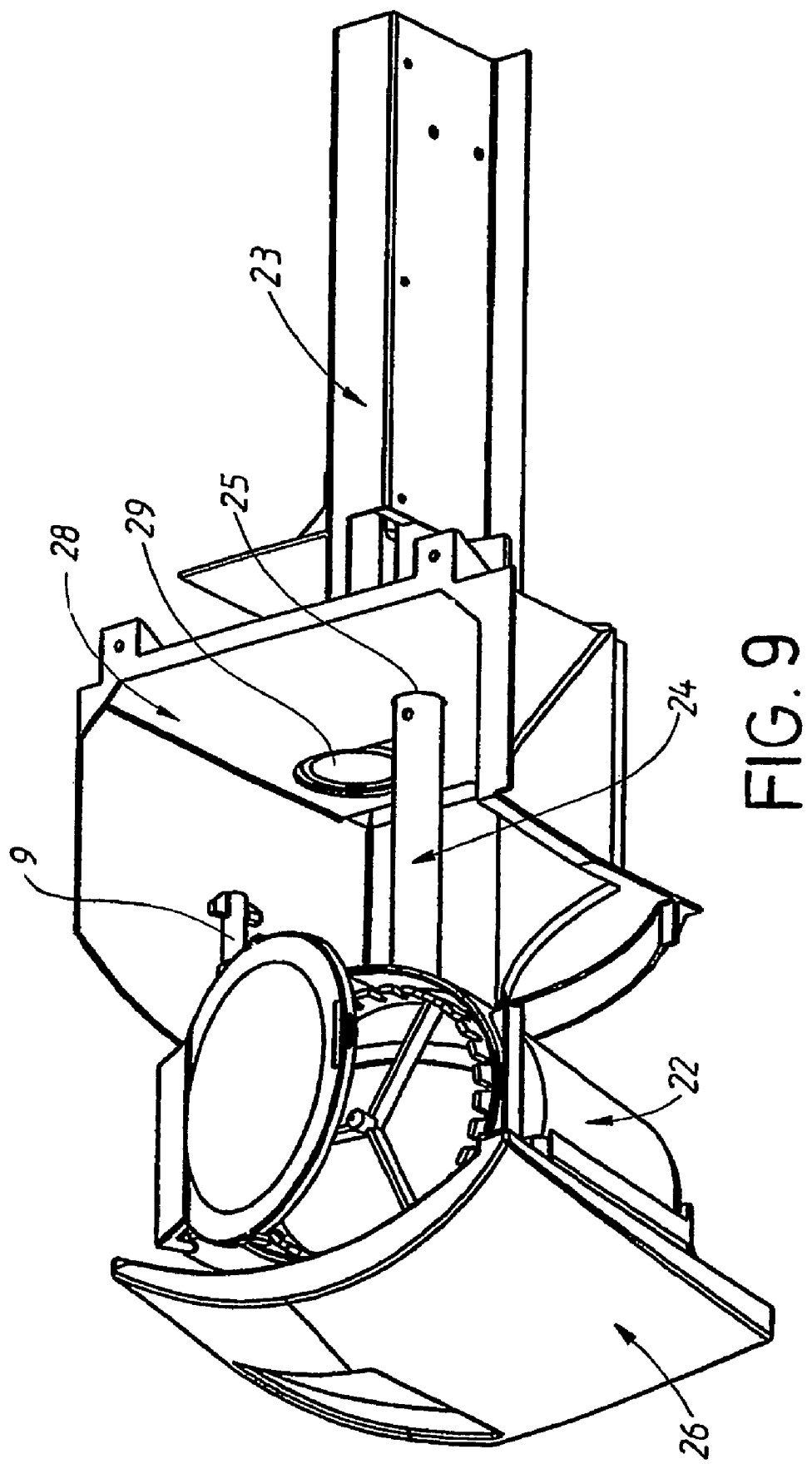
FIG. 9 is a perspective view of an automatic dosing device of present invention according to FIG. 1.

The container unit 22 could be operated together with an automatic dosing device such as the one shown in FIG. 9. The device as part of the preferred embodiment is intended to co-operate with a laundry washing machine. The unit is mounted on a guiding mechanism comprising a guiding frame 23 and a guiding shaft 24. The shaft stretches through the guiding opening 25 and is attached to the receptacle 1 of the container unit 22. On the container unit is a front piece 26 arranged. The dosing screw 9 is arranged with the container unit, see FIG. 2. A mixer 28 is designed to receive the unit in its inner position. An opening 29 in which an electric motor is arranged has a clutch to receive the screw.

The function of the refill container unit 22 will know be described referring to the above mentioned information and the figures. The unit 22 according to the preferred embodiment is intended to be used together with the automatic dosing device comprising the dosing screw 9 inside the channel 8. A control system and an electric motor control and operate the unit. The guiding mechanism has as a task to guide the container unit between an outer position away from the mixer 28 and an inner position inside the mixer, not shown in FIG. 9. This makes it possible to turn the container unit and its front into the upright, vertical position shown in FIG. 9.

Is this position the container cover 2 can be opened and detergent filled into the agitating part 14. The operator thereafter turns the container unit 22 in an anti-clockwise direction (seen from the left side in FIG. 9). The operator further moves the horizontal container part towards the mixer 28, guided by the guiding mechanism. By means of the shape of the mixer the conical shaped container unit is finally guided into the inner position inside the mixer. During this final movement the dosing screw end moves towards the opening 29. The motor is thereby in turning engagement with the dosing screw. The front 26 as a part of the washing machine finally keeps the container in its inner position.

A turning force is transmitted from the motor to the dosing screw 9. The screw mounted inside the channel 8 is thereby turned. Since the thread of the screw interacts with the teeth 21 of the agitating part 14 the rotating screw forces the part to rotate inside the receptacle 1. The part which is rotatably attached by means of the recess 15 and the shaft pin 16, rotates freely. By the shape of the interacting teeth the screw is cleaned from detergent clogged between the threads when the screw rotates.

If there is detergent inside the agitating part 14 and the part is placed such that the rotation axis is in a horizontal position the flanges 18 inside the rotating part feeds the detergent. Since the pot has a conical shape the detergent is agitated and fed towards the teeth 21 and the screw 9 inside the channel 8. The screw feed the detergent through the channel. The detergent finally reaches the outside of the receptacle 1 and falls on to the mixer 28. It is there mixed with water and further fed to the tub of the washing machine. This agitation and feeding is the main task of the agitating part in order to solve the above mentioned objects and below other embodiments are disclosed that achieves similar functions. A problem with this agitating part operating inside a receptacle 1 is that between them is a space in which detergent tends to be collected. The part therefore has the outer ridge 19 that when the part rotates feeds the collected detergent towards the teeth. In order to achieve this effect the pot should be in the horizontal position. The outer ridge also guides the rotating agitating part inside the receptacle 1.

Another object of the present invention is the ability of clean and exchange the agitating part 14 whenever necessary. For instance when the operator uses two different parts for different kind of detergent it should be easy to exchange them. The part 14 is therefore removably and rotatably attached to the receptacle 1 and the cover 2. When the operator needs to exchange or clean the pot he/she just open the cover, when the container unit is in a vertical position, and lifts out the agitating part with the aid of the frame 17. The screw is mounted in such a manner that it is possible to make this exchange. Another possibility in order to achieve different agitating parts for different detergent is to simply use two refill container units. Since the units are simple and have few parts this could be a cost-effective solution.

Figure 7:
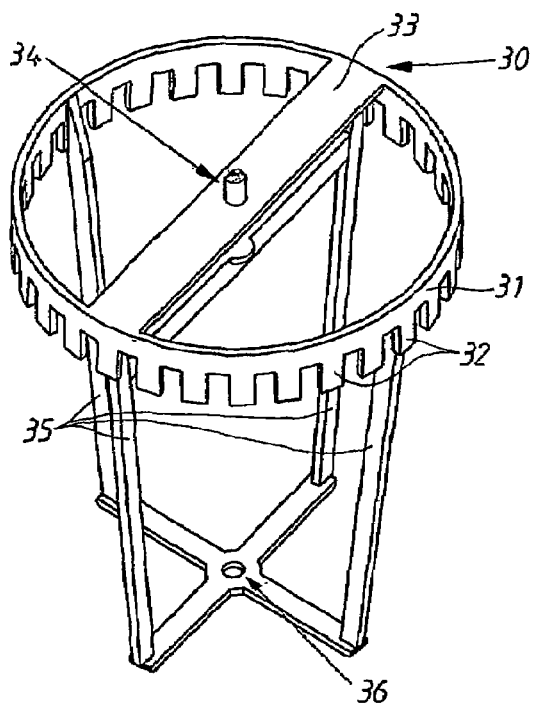
FIG. 7 is a perspective view of a second embodiment of an agitating part of the present invention according to FIG. 1.
Figure 8:
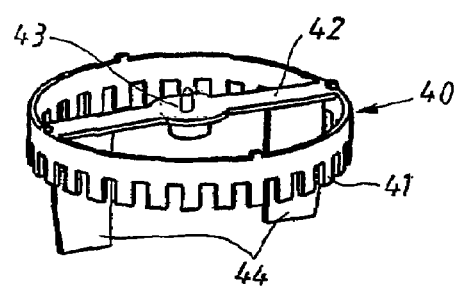
FIG. 8 is a perspective view of a third embodiment of an agitating part of the present invention according to FIG. 1.

FIGS. 7-8 demonstrate other types of embodiments in order to achieve a refilling container unit to solve the objects mentioned. These objects are container units that are easy to clean and refill, which by themselves avoid clogged material. FIG. 7 discloses a first alternative embodiment. It shows an alternative to the earlier described agitating part. Instead of a pot an agitating frame 30 is detachably and rotatably attached to the receptacle 1 and cover 2. The frame has a ring 31 with teeth 32. By a support 33 a pin 34 is created to interact with shaft pin 13 of the closed cover of the receptacle to achieve a first end of a rotational axis. Further four frame arms 35 are bent and attached to each other. An opening 36 is created to interact with the shaft pin 10 of the receptacle to achieve a second end of the same rotational axis. Through the interactions the agitating frame mounted inside the closed container unit 1 forced by the screw can rotate in a proper way inside the receptacle, which is essential to achieve the objects mentioned above. The agitating frame also has a conical shape to fit inside the receptacle in a proper way.

Figure 1:
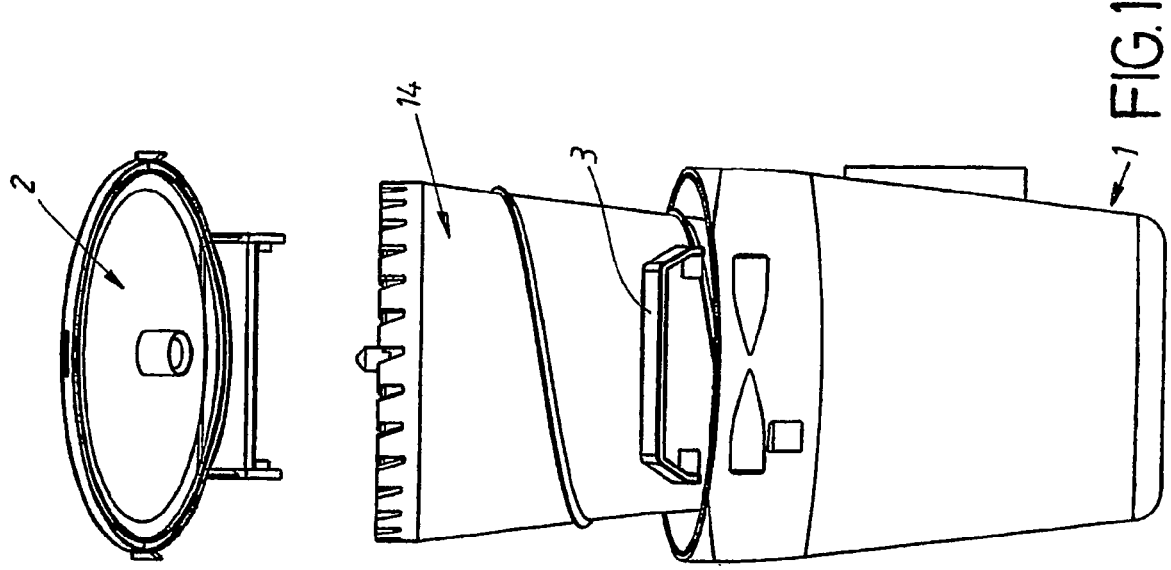
FIG. 1 is a side view of a refill container unit according to the present invention.
Figure 4:
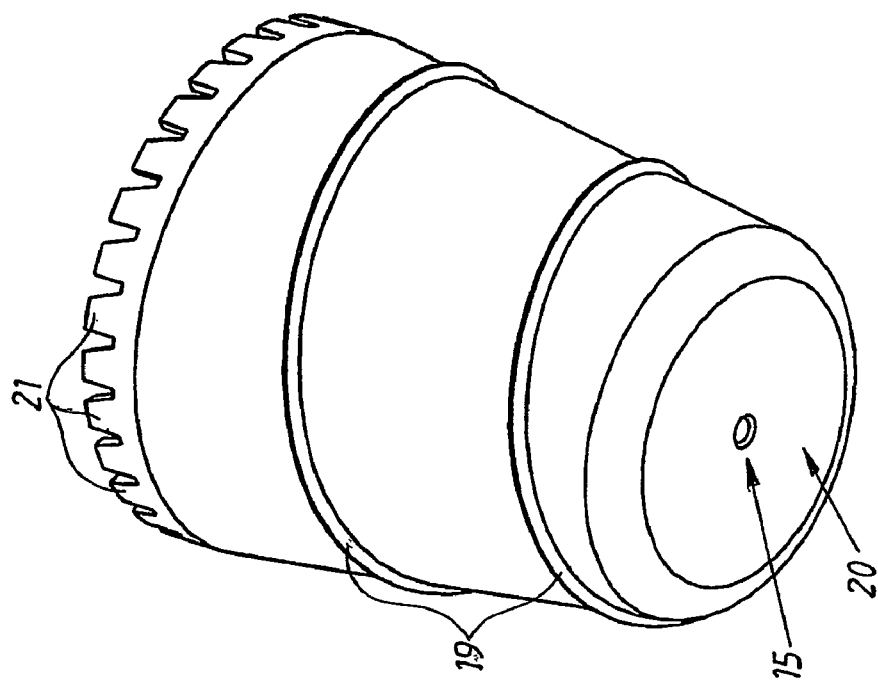
FIG. 4 is a perspective view of an agitating part of the present invention according to FIG. 1.
Figure 3:
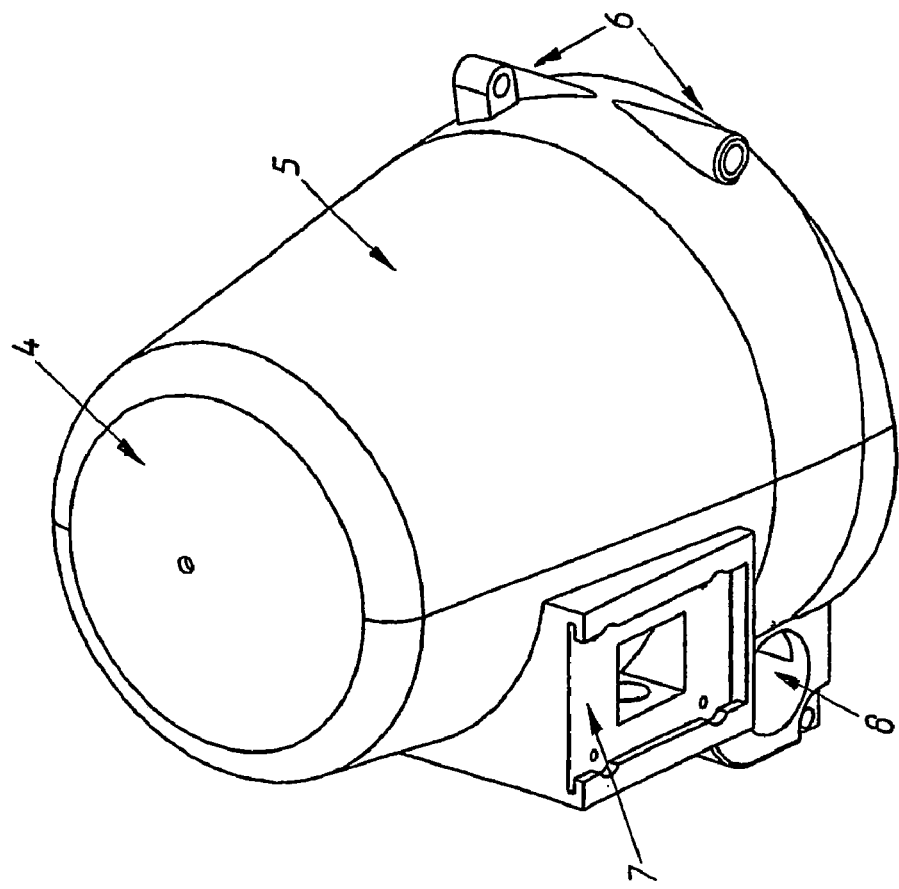
FIG. 3 is a perspective view of a container part of the present invention according to FIG. 1.
Figure 5:
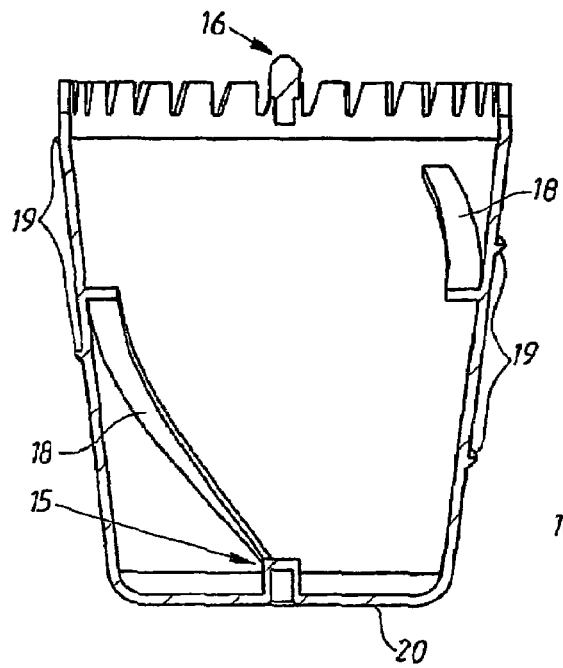
FIG. 5 is a vertical section of the agitating part according to FIG. 4.

FIG. 8 discloses a second alternative embodiment. It shows another alternative of an agitating part. An agitating ring 40 with teeth 41 is rotatably attached to the cover 2 demonstrated in FIG. 1. The ring has a support 42 with a pin 43 that interacts with the shaft pin 13 of the cover. The agitating ring rotatably arranged by the cover can forced by the screw rotate in a proper way inside the closed container unit, which is essential to achieve the objects mentioned above. The frame also constitutes two wings 44.

The function of the above mentioned alternative embodiments for an agitating part is now described. Both embodiments rotate inside the container unit by interaction between the screw and its teeth. In the first alternative embodiment 30 the frame arms 35 agitate and feed the detergent towards the screw. In the second alternative embodiment the wings 44 agitate and transport some parts of the detergent towards the screw. These wings do not cover the whole receptacle inside.

Another object of the present invention is the possibility to clean the receptacle 1 and the agitating part whenever necessary. The agitating part is therefore detachably and rotatably attached to the receptacle 1 and the cover 2. When the operator needs to switch or clean the receptacle he/she just open the lid 2, when the container unit is in a vertical position, and lifts out the agitating part.

It will be appreciated by those ordinary people skilled in the art that the present invention can be embodied in other specific forms without departing from the spirit or essential character thereof. The present disclosed embodiment is therefore considered in all respect to be illustrative and not restrictive. The scope of the invention is indicated by the appended claims rather than the foregoing description, and all changes which come within the meaning and range of equivalents thereof are intended to be embraced therein.

An example thereof is the possibilities to use the refilling container unit in another machine that requires a storing and dosing container unit. Such machines could be dish washing machines or coffee machines. The scope of the invention is not the machine or the automatic dosing unit:in which the refilling container unit is used. Instead it is the handle of material in any suitable form (granules, powder, liquid etc.) in a rough environment in order to achieve the best possible automatic dosing result.

The invention claimed is:

1. An automatic dosing device for a machine comprising a container unit (22) for dosing material and a dosing screw (9) that feeds material out from the container unit (22), the container unit (22) comprising an essentially cylindrical receptacle (1) and a cover (2) which together encloses an agitating part (14) that by a force transmitted to the part (14) rotates and thereby agitates and transports the material toward the screw (9), wherein the container unit (22) and thereby the receptacle (1) during feeding is placed essentially in a horizontal position and during refilling and cleaning when being arranged on the device is placed essentially in a vertical position with its top above the bottom.

2. An automatic dosing device for a machine comprising a container unit (22) for dosing material and a dosing screw (9) that feeds material out from the container unit (22), the container unit (22) comprising an essentially cylindrical receptacle (1) and a cover (2) which together encloses an agitating part (14) that by a force transmitted to the part (14) rotates and thereby agitates and transports the material toward the screw (9), wherein the agitating part (14), which could be removably attached to the receptacle bottom (4) and the cover (2), is rotatably attached to the receptacle bottom (4) and the cover (2), whereby the shape of the part (14) being essentially similar to the receptacles (1), and wherein the agitating part (14) on its outside wall has at least has one outer ridge (19) shaped as to feed the material toward the screw (9) at least when the part (14) rotates in a first direction.

3. An automatic dosing device for a machine comprising a container unit (22) for dosing material and a dosing screw (9) that feeds material out from the container unit (22), the container unit (22) comprising an essentially cylindrical receptacle (1) and a cover (2) which together encloses an agitating part (14) that by a force transmitted to the part (14) rotates and thereby agitates and transports the material toward the screw (9), wherein the agitating part (14), which could be removably attached to the receptacle bottom (4) and the cover (2), is rotatably attached to the receptacle bottom (4) and the cover (2), whereby the shape of the part (14) being essentially similar to the receptacles (1), and wherein the agitating part (14) on its inside wall has at least has one inner flange (18) to agitate and transport the material towards the screw at least when the pot rotates in a first direction.

4. An automatic dosing device for a machine comprising a container unit (22) for dosing material and a dosing screw (9) that feeds material out from the container unit (22), the container unit (22) comprising an essentially cylindrical receptacle (1) and a cover (2) which together encloses an agitating part (14) that by a force transmitted to the part (14) rotates and thereby agitates and transports the material toward the screw (9), wherein the receptacle (1) has an essentially conical shape with a receptacle bottom (4) that has a smaller diameter than its top closer to the cover (2), and wherein the agitating part (14) comprises a stirring unit (30), which could be removably attached, has an essentially cylindrical frame (31) which is rotatably attached to the cover (2) and from the frame extending arms rotatably attached to the receptacle bottom (4).

5. An automatic dosing device for a machine comprising a container unit (22) for dosing material and a dosing screw (9) that feeds material out from the container unit (22), the container unit (22) comprising an essentially cylindrical receptacle (1) and a cover (2) which together encloses an agitating part (14) that by a force transmitted to the part (14) rotates and thereby agitates and transports the material toward the screw (9), wherein the agitating part (14) comprises a stirring unit (40), which could be removably attached, has an essentially cylindrical frame (31) with extending arms and is rotatably attached to the cover (2).

* * * * *